(12) United States Patent
Alexander

(10) Patent No.: US 7,412,988 B1
(45) Date of Patent: Aug. 19, 2008

(54) PNEUMATIC LEVEL CONTROL

(76) Inventor: Jack Alexander, P.O. Box 1016, Tulsa, OK (US) 74101

( * ) Notice: Subject to any disclaimer, the term of this patent is extended or adjusted under 35 U.S.C. 154(b) by 200 days.

(21) Appl. No.: 11/457,351

(22) Filed: Jul. 13, 2006

(51) Int. Cl.
*F16K 31/18* (2006.01)

(52) U.S. Cl. .................. 137/446; 137/398; 137/414

(58) Field of Classification Search ............... 137/413, 137/414, 416, 398, 446, 625.66; 251/251
See application file for complete search history.

(56) References Cited

U.S. PATENT DOCUMENTS

| | | | | |
|---|---|---|---|---|
| 1,618,331 A | * | 2/1927 | Gilchrist | 137/422 |
| 1,674,341 A | * | 6/1928 | Penn | 137/446 |
| 1,871,044 A | * | 8/1932 | Crosthwait, Jr. et al. | 137/414 |
| 1,894,367 A | * | 1/1933 | Corcoran | 137/416 |
| 2,944,562 A | * | 7/1960 | Glasgow et al. | 137/414 |
| 2,995,201 A | * | 8/1961 | Stafford et al. | 251/231 |
| 3,840,044 A | * | 10/1974 | Harris et al. | 137/413 |
| 3,970,099 A | * | 7/1976 | Murphy et al. | 137/446 |
| 4,026,326 A | * | 5/1977 | Wells et al. | 137/625.66 |
| 4,114,642 A | * | 9/1978 | Robbins | 137/446 |
| 4,436,109 A | * | 3/1984 | Taylor | 137/413 |
| 4,505,288 A | * | 3/1985 | Murphy et al. | 137/414 |
| 4,542,765 A | * | 9/1985 | Glasgow et al. | 137/414 |
| 4,543,979 A | * | 10/1985 | Olmsted et al. | 251/251 |
| 4,573,489 A | * | 3/1986 | Carlton et al. | 137/59 |
| 4,577,657 A | * | 3/1986 | Alexander | 137/448 |

* cited by examiner

*Primary Examiner*—Stephen M. Hepperle
*Assistant Examiner*—Craig Price
(74) *Attorney, Agent, or Firm*—Head, Johnson & Kachigian, P.C.

(57) ABSTRACT

An improved pneumatic level control for the activation, deactivation or regulation or a downstream device or process by way of pneumatic signal in response to increased liquid volume in an attached vessel or container.

20 Claims, 7 Drawing Sheets

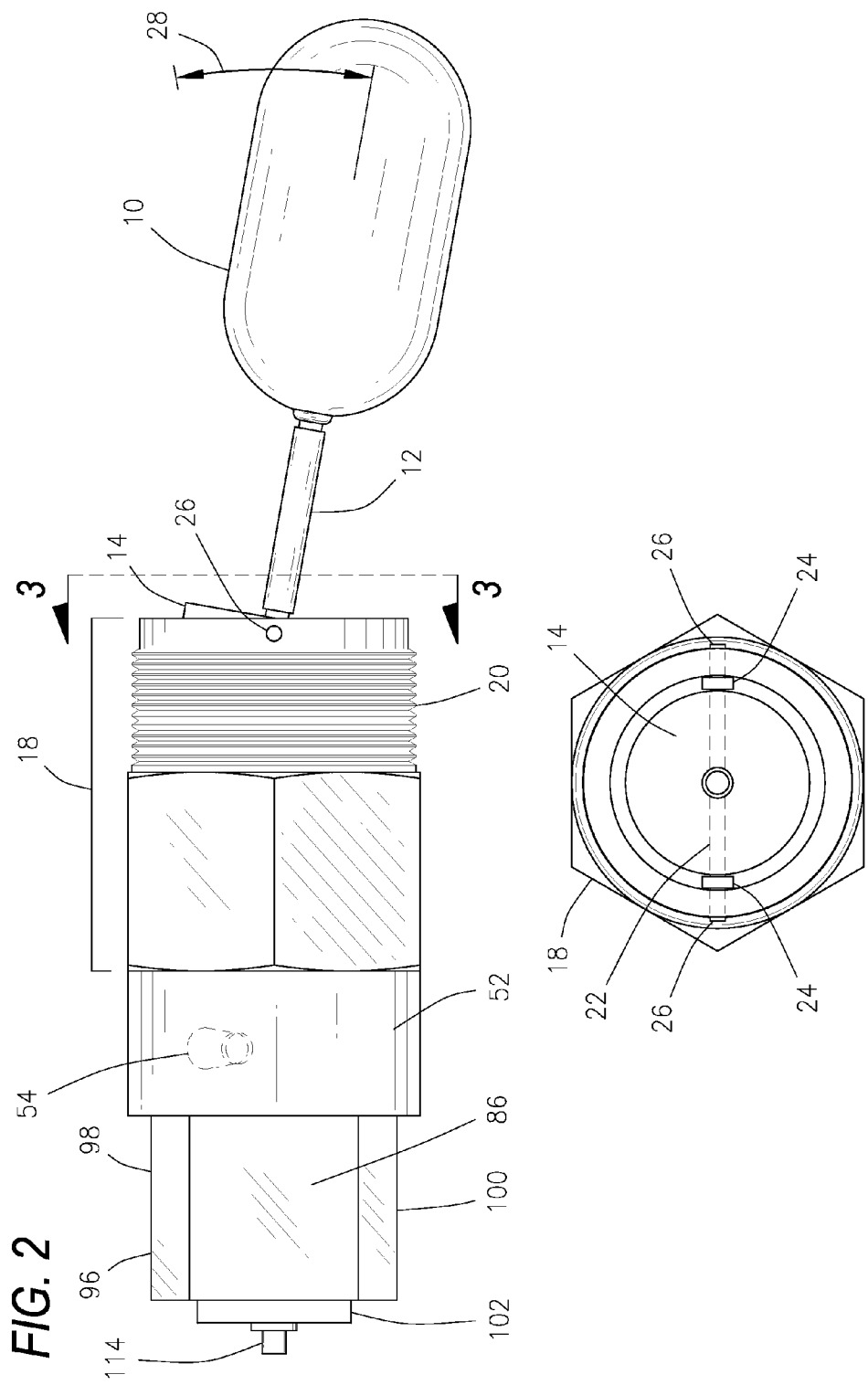

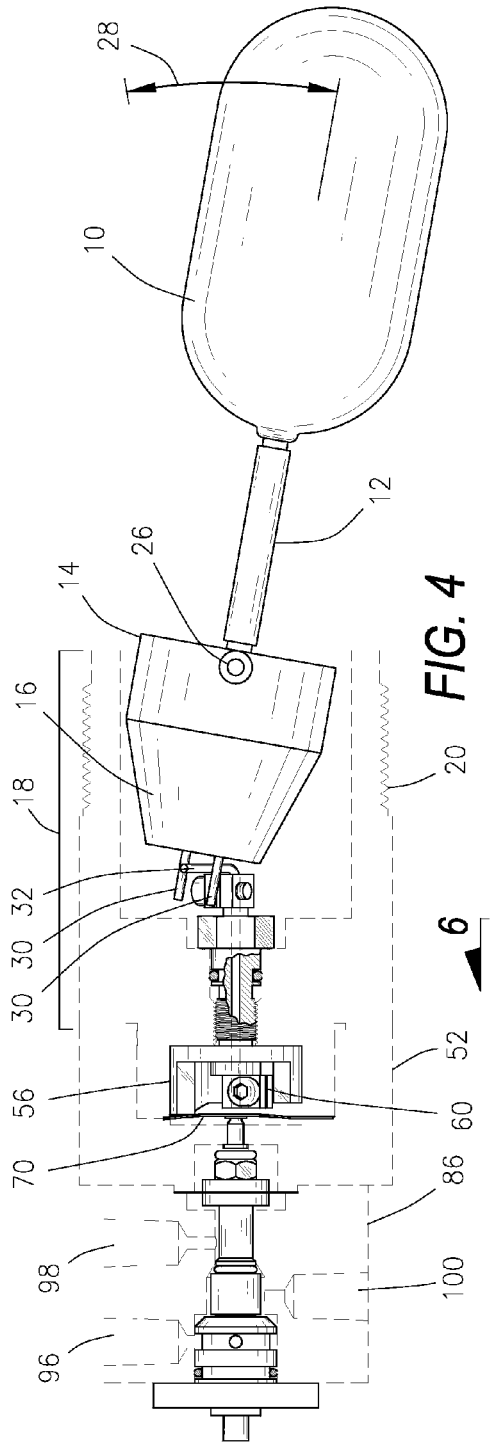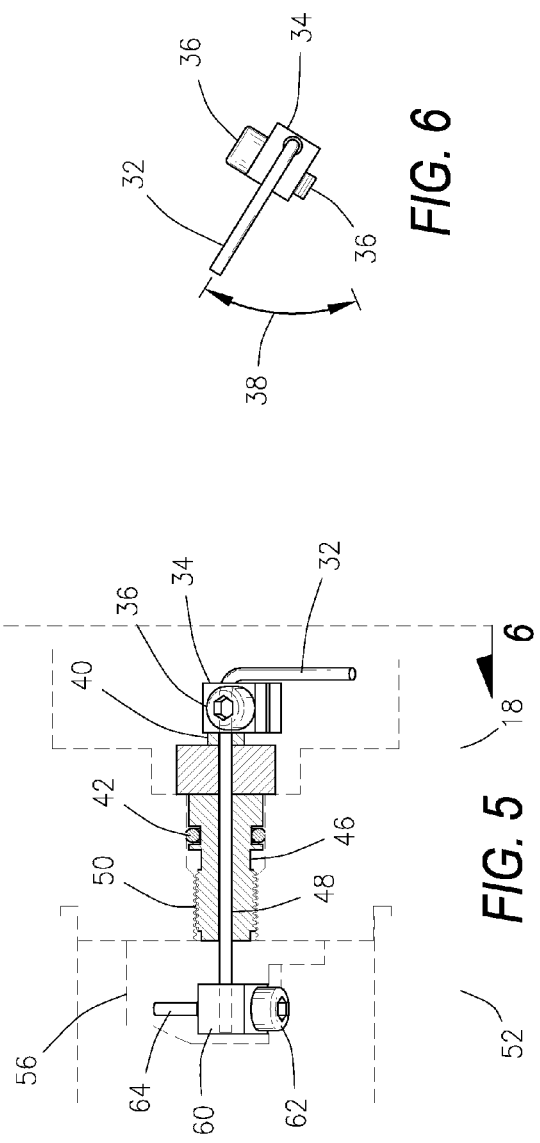

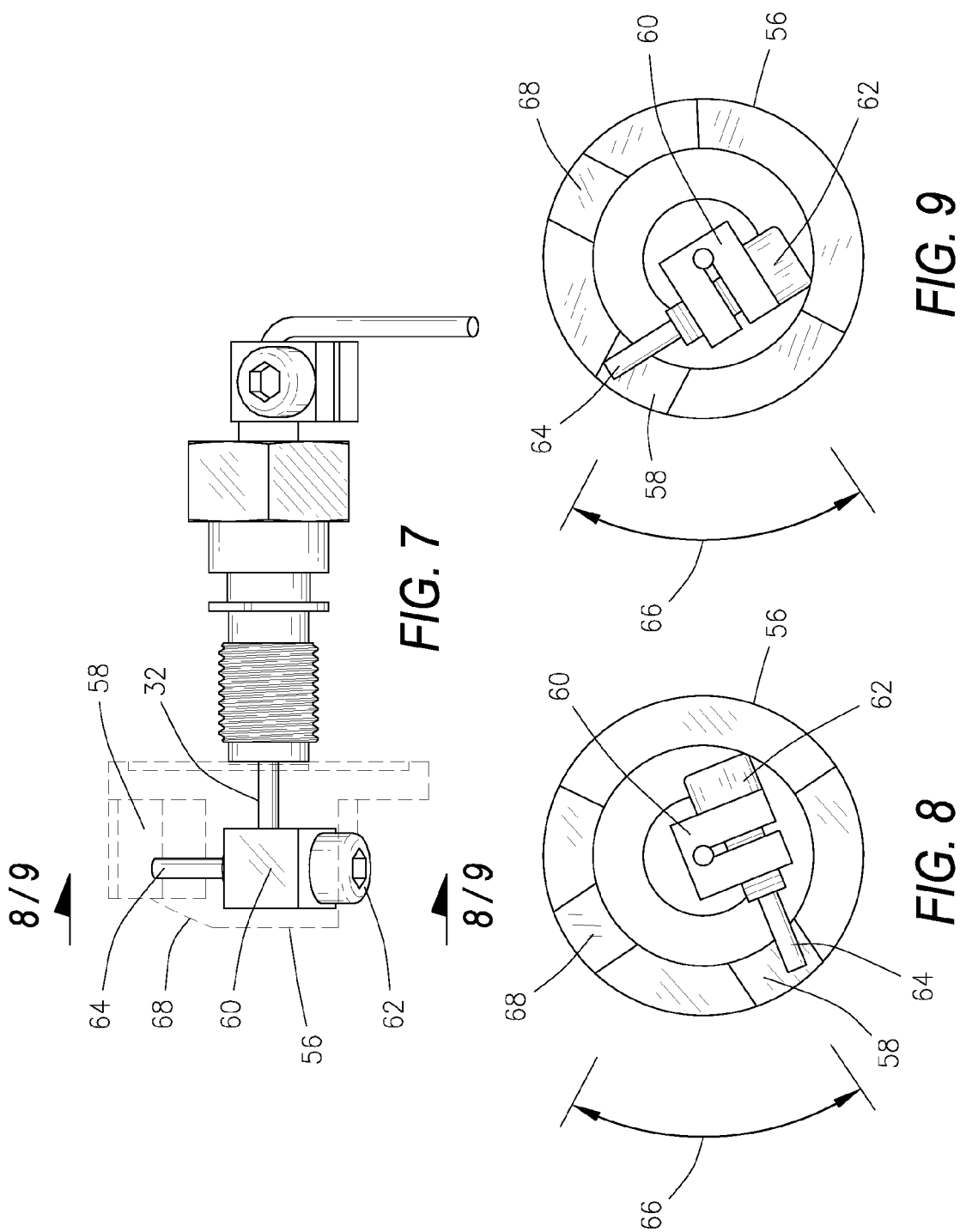

PNEUMATIC LEVEL CONTROL

CROSS-REFERENCE

Not Applicable.

STATEMENT REGARDING FEDERALLY SPONSORED RESEARCH DEVELOPMENT

Not Applicable.

REFERENCE TO A SEQUENCE LISTING, A TABLE OR A COMPUTER PROGRAM LISTING COMPACT DISC APPENDIX

Not Applicable.

BACKGROUND OF THE INVENTION

1. Field of the Invention.

This invention relates to level control devices that are actuated in response to increasing liquid volume in a given space or vessel, such that when the volume is at or below a given level, the control device maintains or regulates a particular condition and when the volume reaches that level, the control device maintains or regulates a second condition.

2. Related Art.

There are a number of level controls or float devices that are well-known in the art that feature a variety of materials, designs and mechanisms for action. However, the present invention is distinguishable in that it discloses a number of improvements over the prior art. The present invention is an inexpensive, reliable and easily serviceable level control.

BRIEF SUMMARY OF THE INVENTION

The present invention, a pneumatic level control, boasts a number of improvements over level control devices widely known in the art. The disclosed device is relatively inexpensive, reliable and easily serviceable. It features a float mechanism and an interconnected series of pneumatic values that, when actuated by the float in response to increased liquid volumes, send a pneumatic signal to a downstream device such as a dump valve. While the present invention has particular applicability in the field of natural gas scrubbers, those skilled in the art will appreciate that the present invention may be utilized in virtually any application where it is desirable or necessary to have a downstream device or process activated pneumatically in response to an increased volume of liquid in a particular vessel or space. Such downstream devices could include dumps and drains as well as shutoff valves.

BRIEF DESCRIPTION OF THE DRAWINGS

FIG. 2 is a drawing showing the relative position of the general structural members of one embodiment of the disclosed invention.

FIG. 3 is a cross-section of the point of attachment between the counterweight and the central body.

FIG. 4 is a detailed cutaway drawing of one embodiment of the disclosed invention.

FIG. 5 is detailed drawing of the L-shaped rod assembly.

FIG. 6 is a cross-section of the L-shaped rod assembly showing the range of rotation.

FIG. 7 is a detailed drawing of the cam assembly.

FIG. 8 is a cross-section of the cam relation to the cam pin when the float is down.

FIG. 9 is a cross-section of the cam in relation to the cam pin when the float is up.

DETAILED DESCRIPTION OF THE DISCLOSED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's composition and the arrangement of its components without departing from the spirit and scope of this disclosure. It is understood that the invention is not limited to the embodiments set forth herein for purposes of exemplification.

The present invention is an improved float control device. As the volume of liquid within a vessel or container increases, the float rises and actuates a series of pneumatic valves which in turn permit a pneumatic signal to be sent to a downstream device such as a dump valve which will, when activated, drain the contents of the vessel. The device is maintained under continuous air pressure from an external air supply. One application in which this is desirable is to empty liquid from a natural gas scrubber, which might ordinarily require an attendant. The device can also be utilized in virtually any application where it is desirable or necessary to activate a downstream process or device in response to increased liquid volumes.

In the preferred embodiment, the present invention is installed with the float inside a vessel, and is connected at via pneumatic tubing at an inlet port to an external air supply and at an outlet port to a dump valve. As the liquid level within the vessel rises, the present invention causes a pneumatic signal to be sent to the dump valve, thereby causing the vessel to drain its liquid contents.

Figure 1:
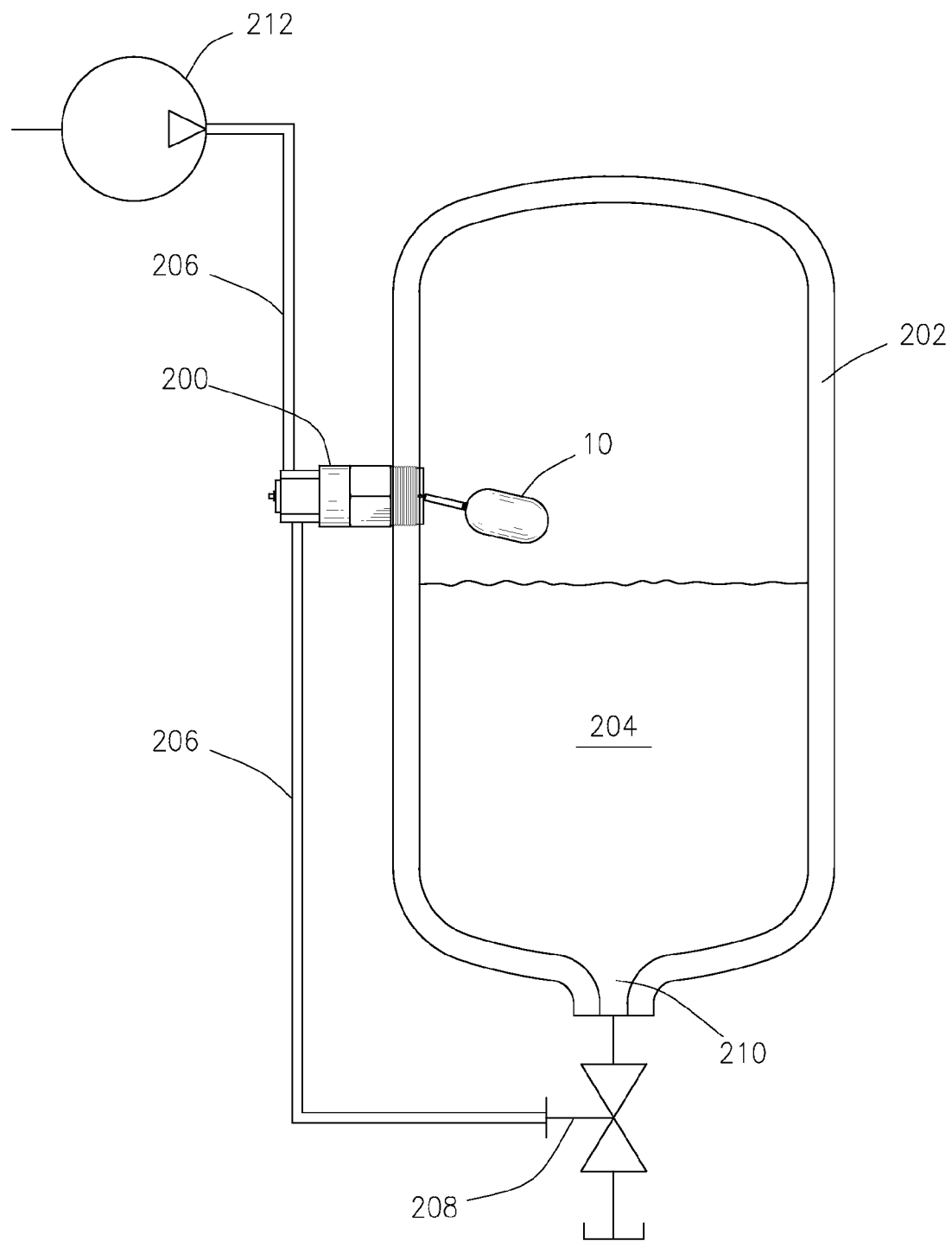
FIG. 1 is a schematic drawing of an embodiment of the present invention being utilized in a vessel.

With respect to FIG. 1, pneumatic level control 200 is attached to the side of vessel 202, with the float 10 being inside vessel 202. Pneumatic level control 200 is connected to an external pressurized, continuous, and regulated air supply 202 via suitable pneumatic hose 206. Liquid 204 is introduced into vessel 202. As the level of liquid 204 rises to the level of pneumatic level control 200, the float 10 rises and by the means described in detail below, pneumatic level control 200 directs air flow via suitable pneumatic hose 206 to dump valve 208, thereby activating dump valve 208 which opens vessel 202, causing liquid 204 to drain from vessel 202 by way of waste drain 210.

Referring now to FIG. 2, pneumatic level control 200 generally comprises the float 10, float arm 12, counterweight 14, central body 18, valve mounted 52, and valve body 86. Float 10 is attached to the distal end of float arm 12. The proximal end of float arm 12 is attached to counterweight 14. In the disclosed embodiment, float arm 12 has internally threaded opening at each end, and float 10 and counterweight 14 each have protruding, externally threaded members that screw securely within the opposite ends of float arm 12. Any suitable means of attachment between these members may be utilized. Counterweight 14 is attached to central body 18 using a counterweight pivot pin 22 situated within counterweight 14 (see FIG. 3. Also regarding FIG. 3, counterweight pivot pin 22 attaches to central body 18 at opposite points of attachment 26, and counterweight 14 is separated from central body 18 with a bushing 24 at either end of counterweight pivot pin 22.

Referring back to FIG. 2, the central body 18 has a generally hexagonal shape with an externally threaded cylindrical portion 20 for attachment to vessel 202. Central body 18 is attached to valve mount 52. Valve mount 52 is attached to valve body 86. Valve mount 52 is continually vented to the outside atmosphere by way of valve mount vent 54. Valve cap 102 is attached to valve body 86, and override button 114 is centrally located on valve cap 102. In the disclosed embodiment, screws are the means for attachment between central body 18 and valve mount 52, between valve mount 52 and valve body 86, and between valve body 86 and valve cap 102, but any suitable means of attachment between these members may be utilized.

Regarding FIG. 4, float 10 is attached to counterweight 14 by way of float arm 12. As disclosed above, any suitable means of attachment between these elements may be utilized. Counterweight 14 is a tapered cylindrical member that is enclosed within and attached to a central body 18. Counterweight 14 is pivotally attached to central body 18 at points of attachment 26 using counterweight pivot pin 22 (see FIG. 3). The assembly consisting of float 10, float arm 12 and counterweight 14 pivots freely within the range of vertical travel 28. Attached to the tapered end 16 of counterweight 14 are two parallel counterweight pins 30 which extend parallel to the axis of float arm 12 and pivot freely in concert with counterweight 14.

Also contained within central body 18 is the short end of a rotatable L-shaped rod 32. (See also FIG. 5.) The short end of L-shaped rod 32 is situated on a separate plane between the counterweight pins 30 such that it is acted upon by and rotates freely in response to contact from the pivoting counterweight pins 30 but does not travel more than the distance between them. Now referring to FIG. 5, L-shaped rod 32 is attached, the point of attachment being adjacent to its 90-degree elbow, to rod clamp 34 using rod clamp screw 36. From rod clamp 34, the long end of L-shaped rod 32 extends through a follower 40 and into rod channel 48 drilled centrally through the solid portion of central body 18. Rod channel 48 is separated from the hollow portion of central body 18 by an O-ring 42. Inside rod channel 48, L-shaped rod 32 passes through a guide 46 and a threaded bushing 50. The assembly of L-shaped rod 32 and rod clamp 34 rotates freely within the range of rod clamp rotation 38 (FIG. 6).

Still referring to FIG. 5, the long end of L-shaped rod 32 extends through rod channel 48 and into valve mount 52, where it terminates after passing through the center of cam 56. Cam 56 is secured in place by cam clamp 60. The long end of L-shaped rod 32 terminates within cam clamp 60 and is attached to cam clamp 60 using cam clamp screw 62. Attached to one end of cam clamp screw 60 is cam pin 64. With respect to FIGS. 7, 8 and 9, cam pin 64 extends through cam slot 58 such that cam 56 is acted upon by and rotates in response to contact from cam pin 64. Cam 56 rotates freely about L-shaped rod 32 within the range of cam rotation 66. (See FIGS. 8 and 9.) Cam slot 58 is wide than cam pin 64, thus permitting cam pin 64 limited rotation before contacting cam 56. Cam 56 is generally cylindrical and has a sloped surface 68 at a portion of one end, with a wider and a narrower portion necessarily situated about the slope. (See FIG. 7.)

Figure 10:
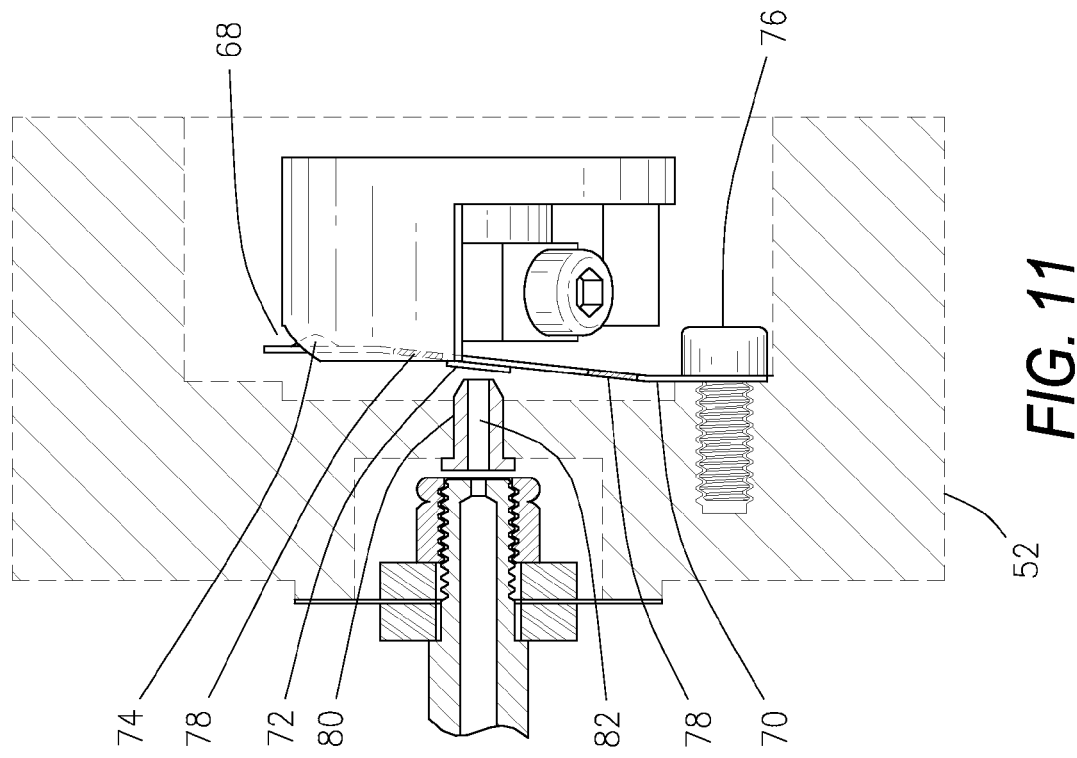
FIG. 10 is a drawing of the cam in relation to the spring when the float is down.

With respect to FIG. 4, also contained within the hollow portion of valve mount 52 is spring 70 having a first end and a second end. Now turning to FIGS. 10 and 11, spring 70 is attached at its first end to the solid portion of valve mount 52, opposite of body 18, using spring screw 76. At the second end of spring 70 is a dimple 74 such that as cam 56 rotates, the protruding surface of dimple 74 on spring 70 contacts the sloped surface 68 and wider portion of cam 56 (FIG. 10). Spring 70 also has a pair of spring holes 78 drilled through it, and a rubber pad 72 secured on the side facing away from cam 56.

Figure 11:
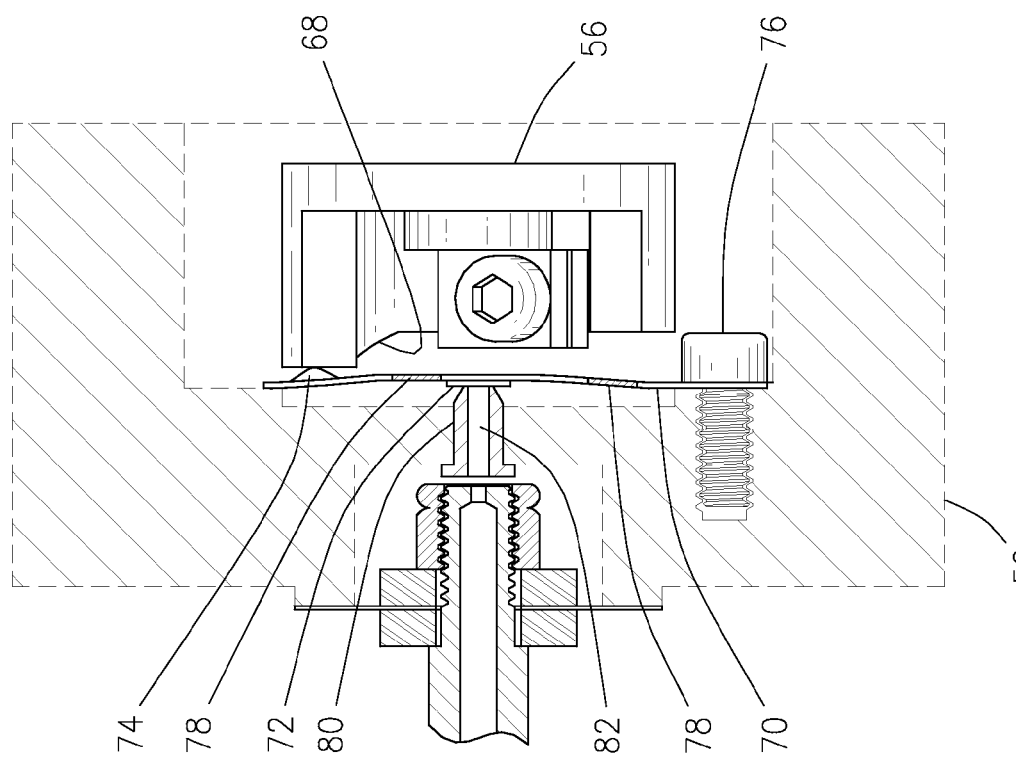
FIG. 11 is a drawing of the cam in relation to the spring when the float is up.

Still referring to FIGS. 10 and 11, also contained within the hollow space of valve mount 52 is a first valve mount orifice 80. Orifice 80 is central to a raised area itself disposed centrally on the internal face of valve mount 52, and is in close proximity to rubber pad 72 on spring 70. When cam 56 rotates in a first direction in response to the rotation of L-shaped rod 32 (FIGS. 7, 8 and 9), contact is made between cam 56 and dimple 74. (FIG. 10) As cam 56 continues to rotate in this first direction, spring 70 travels upward along sloped surface 68. Spring 70 flexes away from cam 56, causing rubber pad 72 to form an airtight seal over first valve mount orifice 80. When cam 56 rotates in a second direction, dimple 74 travels along the wider portion of cam 56 until reaching sloped surface 68, at which point dimple 74 loses contact with cam 56 in a snap action. (FIG. 11) Spring 70 flexes toward cam 56, thereby causing rubber pad 72 to pull away from and break its airtight seal with first valve mount orifice 80. Persons skilled in the art recognize that this snap action feature will promote the timely actuation of dump valve 208 in response to increased volume of liquid 204 and ensure reliable draining of vessel 202.

Figure 12:
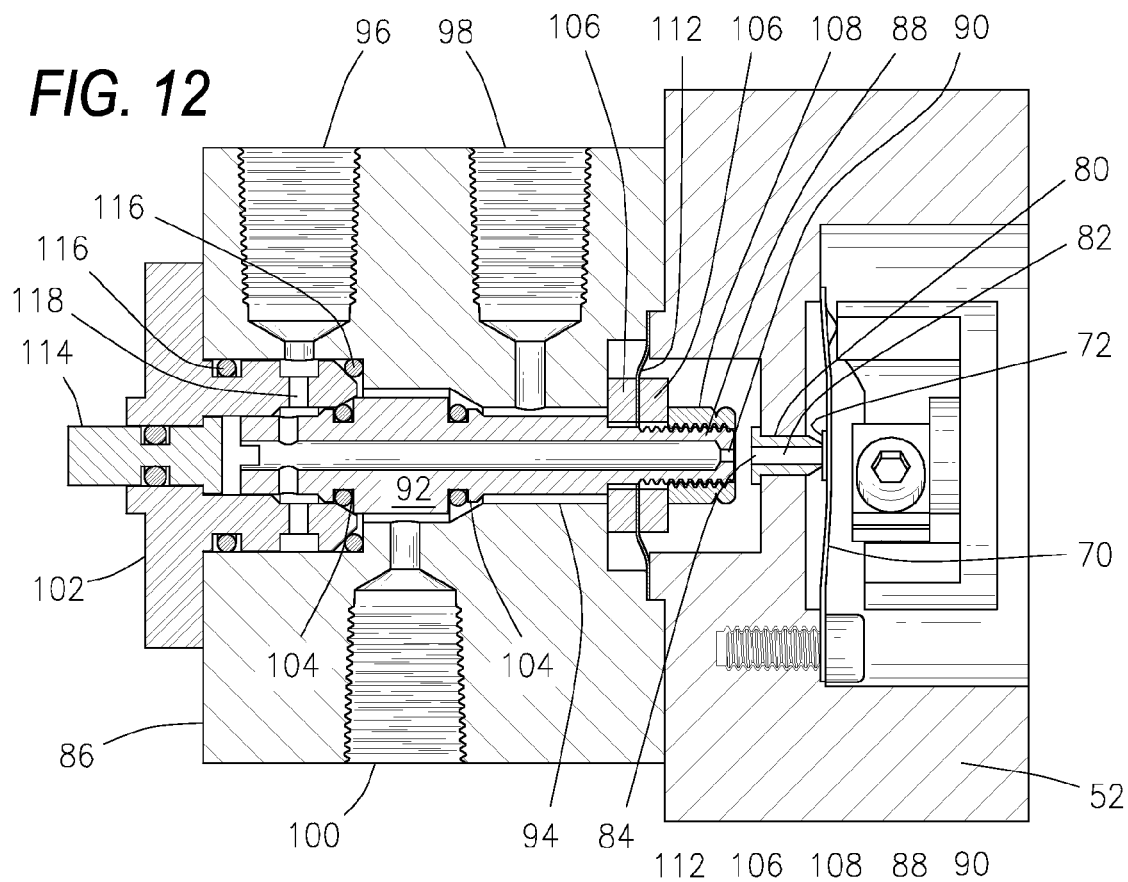
FIG. 12 is a cutaway drawing of the valve body revealing the position of the shuttle when the float is down.
Figure 13:
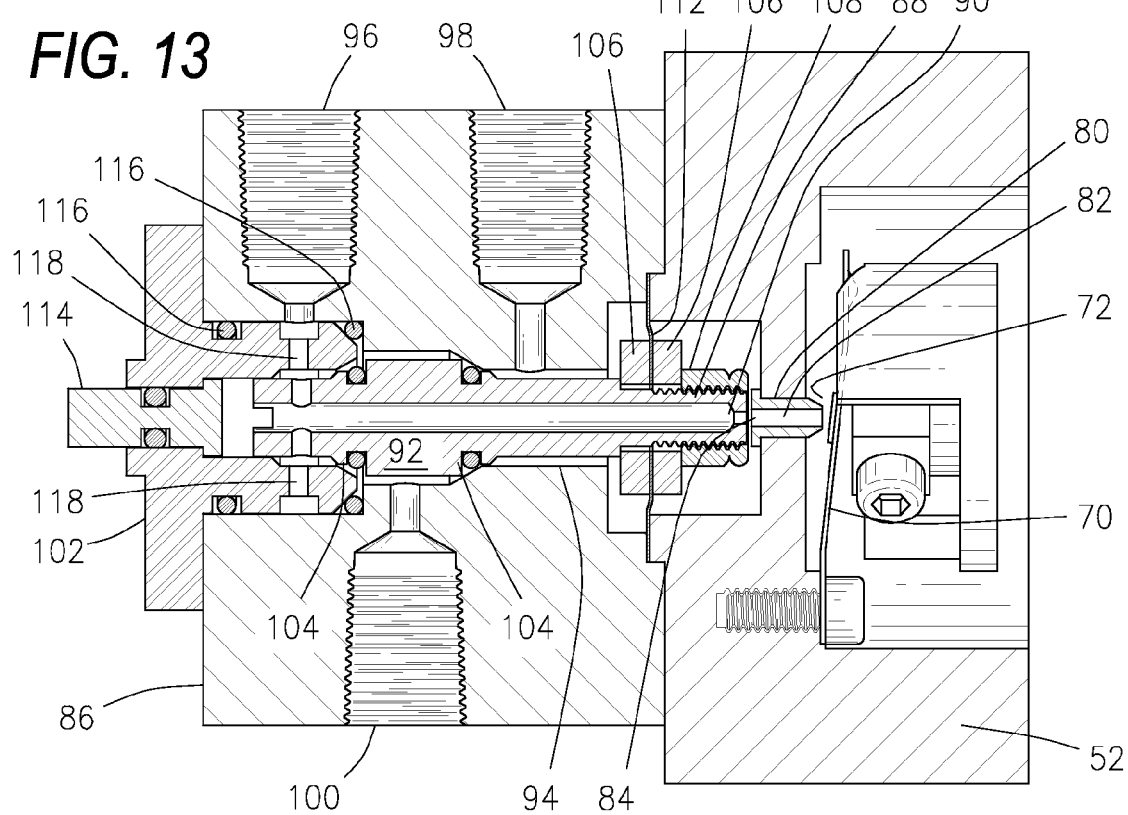
FIG. 13 is a cutaway drawing of the valve body revealing the position of the shuttle when the float is up.
Figure 14:
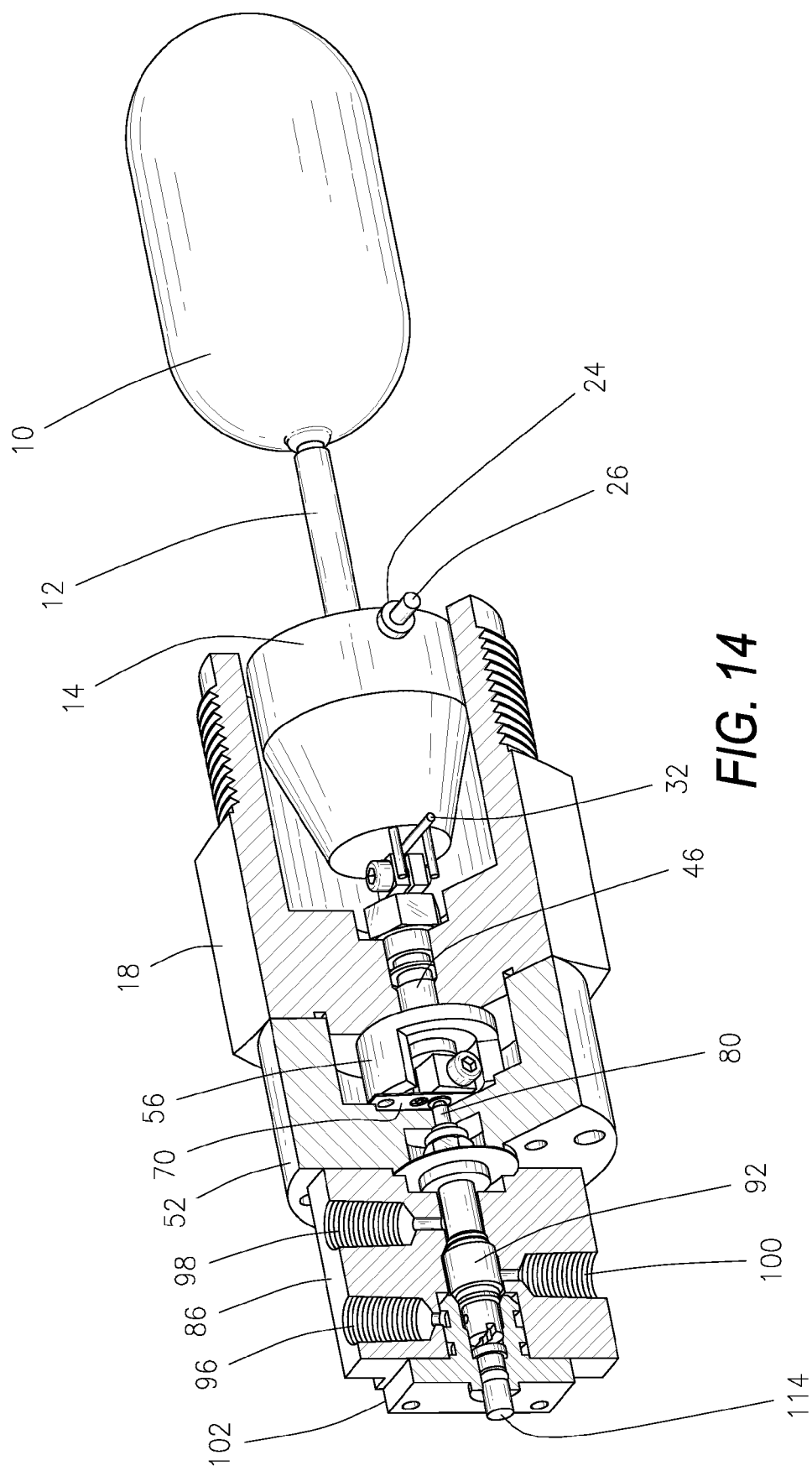
FIG. 14 is a three-dimensional partial cutaway drawing of the present invention.

Now respecting FIGS. 12 and 13, extending from first valve mount orifice 80 into and through the solid portion of valve mount 52 is valve mount channel 82, which ends at second valve mount orifice 84. Valve body 86 attaches to valve mount 52. Valve body 86 has internally threaded openings for an inlet 96, a vent 98 and an outlet 100. Disposed within valve body 86 is shuttle 92 with an externally threaded proximal end 88 having a shuttle orifice 90. Shuttle orifice 90 is integrated into a lock nut containing a nylon insert 108. Lock nut 108 screws onto the externally threaded proximal end 88 of shuttle 92, and secures two washers 106 separated by a diaphragm 112. Shuttle 92 also has a pair of O-rings 104 disposed on its center section.

Shuttle 92 is slidably disposed in shuttle channel 94. Shuttle channel 94 is disposed within valve body 86 such that depending upon the relative pneumatic pressure in valve body 86, shuttle 92 creates an air tight seal within shuttle channel 94, alternatively closing either inlet 96 or vent 98. The distal end of shuttle 92 slides in and out of the innermost portion of valve cap 102. The innermost portion of valve cap 102 further features a valve cap channel 118. An airtight seal is created between valve cap 102 and shuttle channel 94 with a pair of O-rings 116. Centrally disposed upon the external surface of valve cap 102 is override button 114.

In the preferred embodiment, float 10, float arm 12, counterweight 14, body 18, and valve mount 52 are made of stainless steel, and valve body 86 is constructed using aluminum, but any suitable materials may be selected. Cam 56 is preferably made from Delrin® (DUPONT, WILMINGTON, DEL.) but any suitable plastic or other material may be utilized.

The operation of the present invention should now be apparent and cam be summarized as follows. Regarding FIGS. 1, 8, 10, and 12, when the vessel 202 is empty and/or contains an insufficient volume of liquid 204, float 10 is in a 'down' position. Dimple 74 of spring 70 is contacting the wider portion of cam 56. Spring 70 is 'closed', i.e., spring 70 is flexed such that rubber pad 72 forms an airtight seal over first valve mount orifice 80. Air introduced from air supply 212 through inlet 96 cannot therefore escape the system through valve mount channel 82. Air pressure in the space between valve mount channel 82 and shuttle 92 builds and acts against diaphragm 112 to push shuttle 92 into the 'out' position, i.e. shuttle 92 forms an airtight seal within shuttle channel 94 and effectively closes inlet 96. As inlet 96 is closed, those skilled in the art will appreciate that air supply 212 will shut off by way of self regulation. Air pressure between valve body 86 and downstream dump valve 208, as well as air pressure within valve body 86, is passively equalized by way of vent 98. There is thus no positive air flow into outlet 100, and therefore there is no pneumatic actuation of any downstream devices.

With regard to FIGS. 1, 9, 11, and 13, when the volume of liquid 204 within vessel 202 reaches a desired level, float 10 rises into an 'up' position. Cam 56 rotates such that it no longer contacts dimple 74 and spring 70 recoils into an 'open' position under its own tension. Rubber pad 72 no longer forms any seal over first valve mount orifice 80. The equilibrium within valve body 86 is disrupted, as air is drawn out of the system through valve mount channel 82 and vented through valve mount vent 54. Shuttle 92 is pushed by inlet pressure into the 'in' position, i.e., shuttle 92 forms an airtight seal within shuttle channel 94 effectively closing vent 98. Inlet 96 is now open, which subsequently causes self-regulated air supply 212 to resume providing positive air flow into the system. Stasis is achieved and positive air flow passes through valve body 86 and into pneumatic hose 206 by way of outlet 100. A downstream device such as dump valve 208 is pneumatically actuated and causes liquid 204 to drain from vessel 202 through waste drain 210.

Pressing override button 114 when float 10 is 'down', spring 70 is 'closed', and shuttle 92 is 'out', will in turn advance shuttle 92 into the 'in' position described above. One can thereby simulate the conditions under which float 10 is 'up' and spring 70 is 'open'. Only sufficient pressure need be applied to override button 114 to overcome the static air pressure within the system.

What is claimed is:

1. A pneumatic level control, comprising:
    a first housing and a second housing attached to said first housing;
    a float assembly pivotally attached to said first housing; said float assembly comprising a float arm having a first and a second end; a float attached to said first end of said float arm; a counterweight attached to said second end of said float arm; said counterweight being pivotally attached to said first housing;
    a rotatable rod having a first end and a second end; said first end of said rod in communication with said counterweight for converting pivotal motion of said float assembly into rotational motion;
    a cam housed within said second housing; said cam having a base and a cylindrical sidewall; said base of said cam rotatably attached to said second end of said rotatable rod; wherein a section of said cylindrical sidewall of said cam has a sloped surface;
    a flexible, cantilever spring having a first end and a second end; said first end of said spring secured to said second housing; said second end of said spring in contact with said cylindrical sidewall of said cam; wherein said spring flexes between a first position and a second position based on the rotation of said cam;
    a three-way valve assembly attached to said housing; said valve assembly comprising at least one inlet port, at least one vent port and at least on outlet port;
    a first channel between said valve assembly and said second housing;
    a second channel disposed longitudinally within said valve assembly and interconnected with said ports;
    a shuttle slideably disposed within said second channel; said shuttle being slideable between a first shuttle position and a second shuttle position;
    wherein air flow between said valve assembly and said second housing is regulated by flexing said spring between said position and said second position; and
    wherein air flow out of said outlet port is regulated by sliding said shuttle between said first shuttle position and said second shuttle position.

2. The pneumatic level control of claim 1 wherein said spring alternately opens and closes said first channel.

3. The pneumatic level control of claim 1 wherein said shuttle alternately opens and closes said inlet port and said vent port.

4. The pneumatic level control of claim 1 wherein said valve assembly further comprises a mechanism for forcing said shuttle into said second shuttle position.

5. The pneumatic level control of claim 1 wherein said rod, said cam and said shuttle are axially aligned.

6. The pneumatic level control of claim 1 wherein said rod, said cam and said shuttle are axially aligned along a centerline of said first housing, said second housing and said valve assembly.

7. The pneumatic level control of claim 1 wherein said valve assembly further includes an override button.

8. The pneumatic level control of claim 1 wherein said first housing is removably attached to said second housing.

9. The pneumatic level control of claim 1 further comprising a flexible diaphragm secured to said shuttle.

10. The pneumatic level control of claim 1 wherein said first end and said second end of said rotatable rod is L-shaped.

11. The pneumatic level control of claim 10 wherein said L-shaped second end of said rod is received within a slot in said cylindrical sidewall of said cam.

12. The pneumatic level control of claim 1 wherein said spring flexes between said first position and said second position in a snap action based on the rotation of said cam.

13. The pneumatic level control of claim 12 wherein said second end of said spring includes a dimple in contact with said cylindrical sidewall of said cam to aid in said snap action.

14. The pneumatic level control of claim 1, wherein said counterweight has at least one member extending outward therefrom that pivots in concert with said counterweight assembly.

15. The pneumatic level control of claim 14, wherein said at least one member comprises two pins extending outward on an axis parallel to said float arm.

16. The pneumatic level control of claim 14 wherein said first end of said rotatable rod that is acted upon by said at least one member.

17. A pneumatic level control, comprising:
    a float assembly pivotally attached to a housing of said pneumatic level control; said float assembly comprising a flow arm having a first and a second end; a float attached to said first end of said float arm; a counterweight attached to said second end of said float arm; said counterweight being pivotally attached to said first housing;

a rotatable rod having a first end and a second end; said first end of said rod in communication with said counterweight for converting pivotal motion of said float assembly into rotational motion;

a cam housed within said housing; said cam having a base and a cylindrical sidewall; said base of said cam rotatably attached to said second end of said roatable rod;

a cantilever spring having a first end and a second end; said first end of said spring secured to said housing; said second end of said spring in contact with said cylindrical sidewall of said cam; wherein said spring flexes between a first position and a second position based on the rotation of said cam;

a valve assembly comprising at least one inlet port, at least one vent port and a least one outlet port;

a shuttle slideably disposed within a channel in said body; said shuttle being slideable between a first shuttle position and a second shuttle position;

a flexible diaphragm secured to said shuttle; and wherein said rod, said cam and said shuttle are longitudinally aligned within said body, respectively.

18. The pneumatic level control of claim 17 wherein said second end of said spring includes a dimple in contact with said cylindrical sidewall of said cam; and wherein said spring flexes between said first position and said second position in a snap action based on the rotation of said cam.

19. The pneumatic level control of claim 17 wherein air flow within said housing is regulated by flexing said spring between said first position and said second position; and wherein air flow out of said outlet is regulated by sliding said shuttle between said first shuttle position and said second shuttle position.

20. The pneumatic level control of claim 17 wherein said housing further comprises a first housing secured to a second housing.

* * * * *